United States Patent
Yoshioka et al.

(10) Patent No.: US 9,971,157 B2
(45) Date of Patent: May 15, 2018

(54) DISPLAY CONTROL METHOD AND SYSTEM FOR EXECUTING THE DISPLAY CONTROL METHOD

(71) Applicant: COLOPL, INC., Tokyo (JP)

(72) Inventors: Takanori Yoshioka, Tokyo (JP); Takeshi Kobayashi, Kanagawa (JP); Takao Kashihara, Ibaraki (JP); Shuhei Terahata, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days. days.

(21) Appl. No.: 15/675,669

(22) Filed: Aug. 11, 2017

(65) Prior Publication Data

US 2018/0031845 A1    Feb. 1, 2018

(30) Foreign Application Priority Data

Jul. 25, 2016 (JP) .................................. 2016-145520
Jul. 25, 2016 (JP) .................................. 2016-145521

(51) Int. Cl.
   *G02B 27/01*   (2006.01)
   *G03B 25/02*   (2006.01)
   *G06F 3/14*    (2006.01)

(52) U.S. Cl.
   CPC ......... *G02B 27/0172* (2013.01); *G03B 25/02* (2013.01); *G06F 3/1431* (2013.01); *G02B 2027/0138* (2013.01)

(58) Field of Classification Search
   CPC ..... G06T 15/20; G06T 19/006; G06T 19/003; G06F 3/012; G06F 3/011; A63F 2300/8082
   See application file for complete search history.

(56) References Cited

U.S. PATENT DOCUMENTS

2014/0160129 A1    6/2014   Sako et al.
2016/0282619 A1*   9/2016   Oto ..................... G02B 27/017
2017/0269685 A1*   9/2017   Marks .................... G06F 3/013

FOREIGN PATENT DOCUMENTS

JP   2003-299874 A   10/2003
JP      2011-169 A    1/2011
(Continued)

OTHER PUBLICATIONS

Office Action in JP Application No. 2016-145520, dated Nov. 22, 2016. 7pp.
(Continued)

*Primary Examiner* — Abbas Abdulselam
(74) *Attorney, Agent, or Firm* — Hauptman Ham, LLP

(57) ABSTRACT

A method includes defining a virtual space including a virtual camera, a character object, and a field in which the character object is movable, the field defining a peripheral direction and surrounding the virtual camera along the peripheral direction. The method includes defining a visual field of the virtual camera. The method includes displaying a visual-field image on a head-mounted display based on the visual field. The method includes detecting a movement input including a lateral-direction component, the lateral-direction being different from the peripheral direction. The method includes moving the character object in the field along the peripheral direction in response to the lateral-direction component of the movement input. The method includes detecting movement of the head-mounted display and changing a direction of the virtual camera based on detected movement of the head-mounted display. The method includes updating the visual-field image based on the direction of the virtual camera.

11 Claims, 13 Drawing Sheets

(56) References Cited

FOREIGN PATENT DOCUMENTS

| JP | 2012-155731 A | 8/2012 |
| JP | 2014-115457 A | 6/2014 |
| JP | 2015-150063 A | 8/2015 |
| JP | 5882517 B1 | 3/2016 |
| JP | 2016-82411 A | 5/2016 |
| JP | 2016-110319 A | 6/2016 |

OTHER PUBLICATIONS

Notice of Allowance in JP Application No. 2016-145520, dated Apr. 18, 2017. 5pp.
Office Action in JP Application No. 2016-145521, dated Nov. 29, 2016. 9pp.
Office Action in JP Application No. 2016-145521, dateded Apr. 18, 2017. 8pp.
YouTube "The Legend of Zelda: Ocarina of Time Time of Life Beyond Time Let's Play Pt.4 Hyrule Castle Town" [online],retrieved Nov. 14, 2016, posted Sep. 27, 2015. URL, https://www.youtube.com/watch?v=Sy5iBDuep4E, 2pp.
Internet Archive Wayback Machine "Super Smash Bros. Smash Brothers X Masters Matome wiki the Shadowmos island",[online] retrieved Nov. 14, 2016, posted Jul. 2, 2014. URL: https://web.archive.org/web/20140702163027/http://www13.atwiki.jp/sumabuRax / pages / 100.html, 1 pp.
Unity 5.3 VR function (user interface) [online] , Mar. 3, 2016, TaoVisor, retrieved Apr. 5, 2017, URL:http://taovisor.com/news/unity-ui-vr/, 6pp.

* cited by examiner

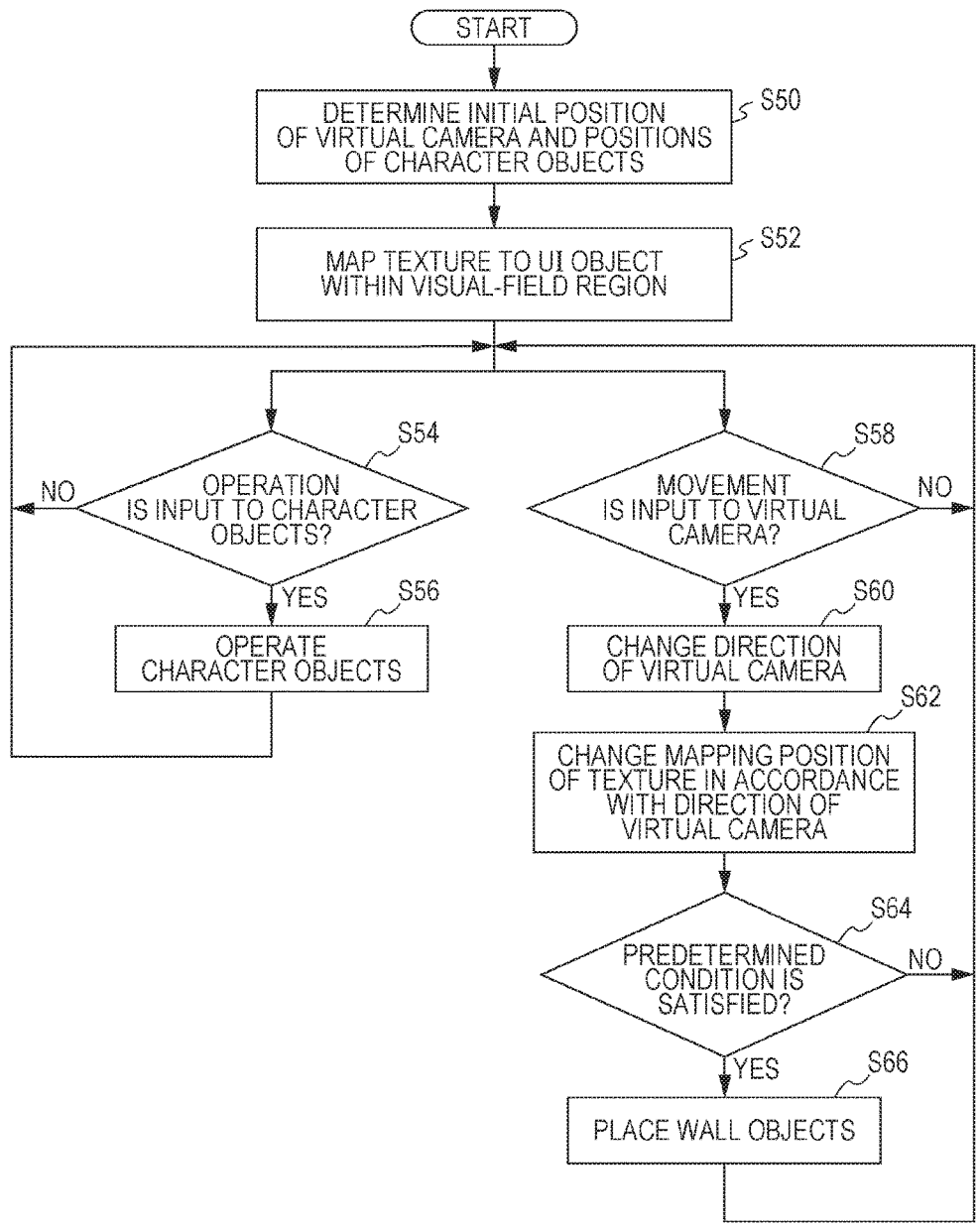

DISPLAY CONTROL METHOD AND SYSTEM FOR EXECUTING THE DISPLAY CONTROL METHOD

RELATED APPLICATIONS

The present application claims priority to Japanese Patent Applications Nos. 2016-145520 and 2016-145521, both filed on Jul. 25, 2016, the disclosures of which are hereby incorporated by reference herein in their entirety.

TECHNICAL FIELD

This disclosure relates to a display control method and a system for executing the display control.

BACKGROUND ART

In Patent Document 1, there is described an invention relating to a game device configured to control movement of a game character on a screen through use of an operation controller, which involves a fighting game configured so that game characters for a match are displayed on the screen and fight with each other while moving in left/right directions of the screen.

PATENT DOCUMENTS

[Patent Document 1] JP 2003-299874 A

SUMMARY

In recent years, there has been known a game (hereinafter sometimes referred to as "VR game") configured so that a user can be immersed into a virtual reality (VR) space by wearing a head-mounted display (HMD), and such a game has been developed actively to provide the user with an experience in operation common in the VR space.

Meanwhile, the user playing the VR game is expected to be confused about a difference in operation feeling from a related-art game.

At least one embodiment of this disclosure has an object to provide a display control method capable of providing a user with an experience common in a VR space while securing an operation feeling of the related-art game. Further, at least one embodiment of this disclosure has an object to provide a system for executing the display control method.

According to at least one embodiment of this disclosure, there is provided a display control method, which is executed by a system including a head-mounted display. The display control method includes generating virtual space data for defining a virtual space containing a virtual camera and a character object. The method includes displaying a visual-field image on the head-mounted display based on a visual field of the virtual camera and the virtual space data. The method includes updating the visual-field image by changing a direction of the virtual camera based on movement of the head-mounted display. The method includes forming a field for defining a peripheral direction in which the character object is movable so that the field surrounds the virtual camera at an initial position of the virtual camera. The method includes moving the character object in the field based on predetermined movement input.

According to at least one embodiment of this disclosure, the display control method is capable of providing a user with an experience common in the VR space while securing an operation feeling of the related-art game can be provided.

BRIEF DESCRIPTION OF THE DRAWINGS

FIG. 13 A flowchart of a display control method according to a at least one embodiment of this disclosure.

DETAILED DESCRIPTION

Embodiments of this disclosure are described below with reference to the drawings. Once a component is described in this description of the embodiments, a description on a component having the same reference number as that of the already described component is omitted for the sake of convenience.

Figure 1:
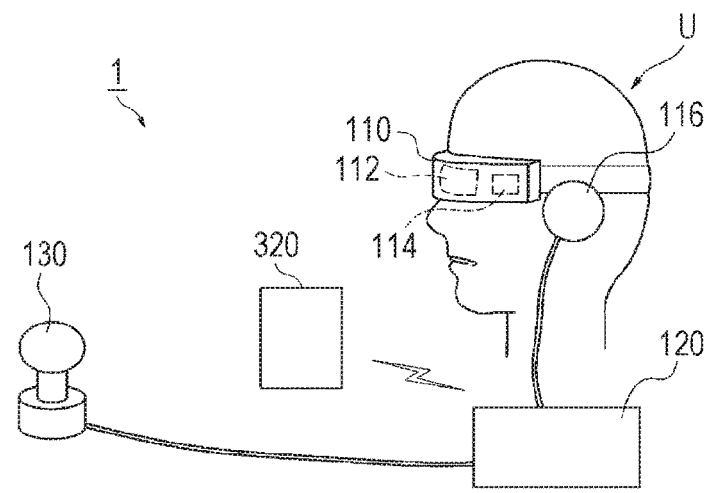
FIG. 1 A schematic diagram of a head-mounted display (HMD) system according to at least one embodiment of this disclosure.

FIG. 1 is a schematic diagram for illustrating a head-mounted display (hereinafter simply referred to as "HMD") system 1 according to at least one embodiment of this disclosure. In FIG. 1, the HMD system 1 includes an HMD 110 worn on a head of a user U, a position sensor 130, a control device 120, and an external controller 320.

The HMD 110 includes a display unit 112, an HMD sensor 114, and headphones 116. The headphones 116 may not be included in the HMD 110. Instead, a speaker or headphones separate from the HMD 110 may be used.

The display unit 112 includes a non-transmissive display device configured to cover a field of view (visual field) of the user U wearing the HMD 110. In at least one embodiment, the HMD 110 includes a transmissive display device, and the HMD 110 may be configured as a temporarily non-transmissive display device through adjustment of a transmittance of the transmissive display device. With this, the user U can see only a visual-field image displayed on the display unit 112, and hence the user U can be immersed in the virtual space. The display unit 112 may include a left-eye display unit in which an image for a left eye of the user U is projected, and a right-eye display unit in which an image for a right eye of the user U is projected.

The HMD sensor 114 is mounted near the display unit 112 of the HMD 110. The HMD sensor 114 includes at least one of a geomagnetic sensor, an acceleration sensor, or an inclination sensor (e.g., angular velocity sensor or gyro sensor), and can detect various movements of the HMD 110 worn on the head of the user U.

The position sensor 130 includes, for example, a position tracking camera, and is configured to detect the positions of the HMD 110. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 may include an infrared sensor or a plurality of optical cameras.

The control device 120 is capable of acquiring information of the position of the HMD 110 based on the information acquired from the position sensor 130, and accurately associating the position of the virtual camera in the virtual space with the position of the user U wearing the HMD 110 in the real space based on the acquired information of the position of the HMD 110.

Figure 2:
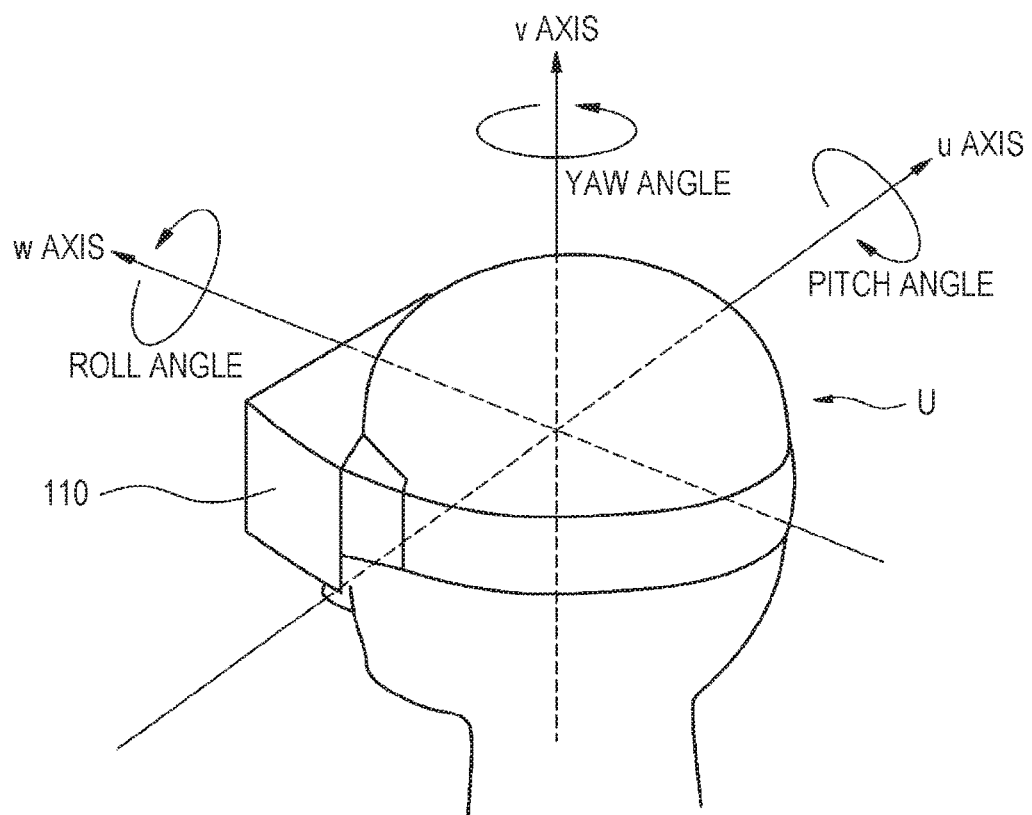
FIG. 2 A diagram of a head of a user wearing an HMD according to at least one embodiment of this disclosure.

Next, with reference to FIG. 2, a method of acquiring information relating to a position and an inclination of the HMD 110 is described. FIG. 2 is a diagram of the head of the user U wearing the HMD 110 according to at least one embodiment of this disclosure. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direction in which the user U stands upright is defined as a v axis, a direction being orthogonal to the v axis and connecting the center of the display unit 112 and the user U is defined as a w axis, and a direction orthogonal to the v axis and the w axis is defined as a u axis. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for controlling a visual axis of the virtual camera, which is configured to define visual-field information, based on the detected change in angles about the respective uvw axes.

Figure 3:
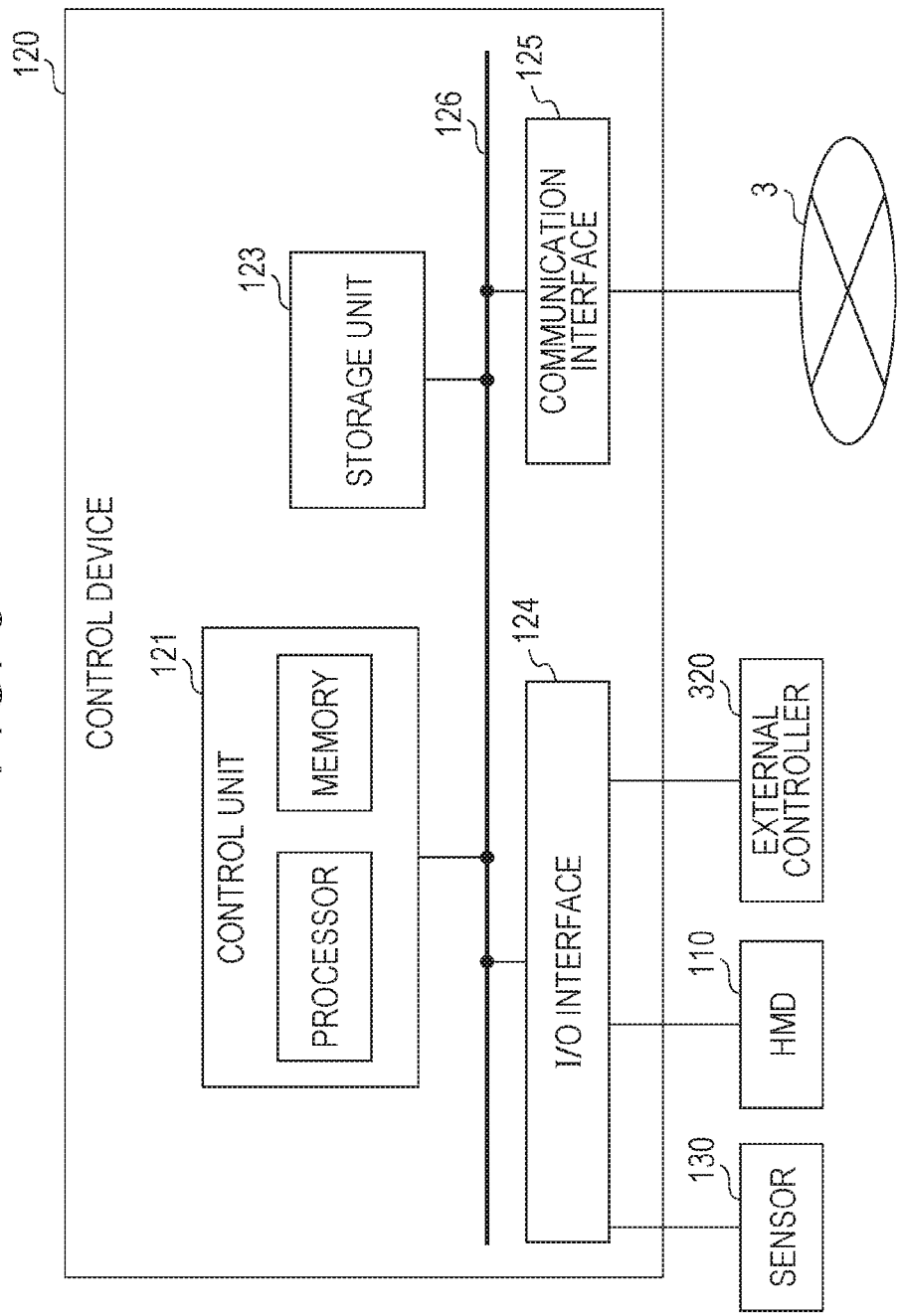
FIG. 3 A diagram of a hardware configuration of a control device according to at least one embodiment of this disclosure.

Next, with reference to FIG. 3, a hardware configuration of the control device 120 is described. In FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 maybe constructed as a personal computer, a tablet computer, or a wearable device separately from the HMD 110, or maybe built into the HMD 110. Further, a part of the functions of the control device 120 may executed by hardware connected to the HMD 110, and other functions of the control device 120 may be executed by hardware separate from the HMD 110.

The control unit 121 includes a memory and a processor. The memory is constructed of, for example, a read only memory (ROM) having various programs and the like stored therein and a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to develop, on the RAM, programs designated by various programs installed into the ROM to execute various types of processing in cooperation with the RAM.

In particular, the control unit 121 may control various operations of the control device 120 by causing the processor to develop, on the RAM, a display control program (to be described later) for executing the display control method according to at least one embodiment on a computer to execute the program in cooperation with the RAM. The control unit 121 executes a predetermined application (game program) stored in the memory or the storage unit 123 to provide a virtual space (visual-field image) on the display unit 112 of the HMD 110. With this, the user U can be immersed in the virtual space provided on the display unit 112.

The storage unit (storage) 123 is a storage device, for example, a hard disk drive (HDD), a solid state drive (SSD), or a USB flash memory, and is configured to store programs and various types of data. The display control program may be incorporated in the storage unit 123. Further, the storage unit 123 may store programs for authentication of the user and game programs including data relating to various images and objects. Further, a database including tables for managing various types of data may be constructed in the storage unit 123.

The I/O interface 124 is configured to connect each of the position sensor 130, the HMD 110, and the external controller 320 to the control device 120 so as to enable communication therebetween, and is constructed of, for example, a universal serial bus (USB) terminal, a digital visual interface (DVI) terminal, or a high-definition multimedia interface (HDMI) (R) terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device via the communication network 3, and is configured to adapt to communication standards for communication via the communication network 3.

Figure 4:
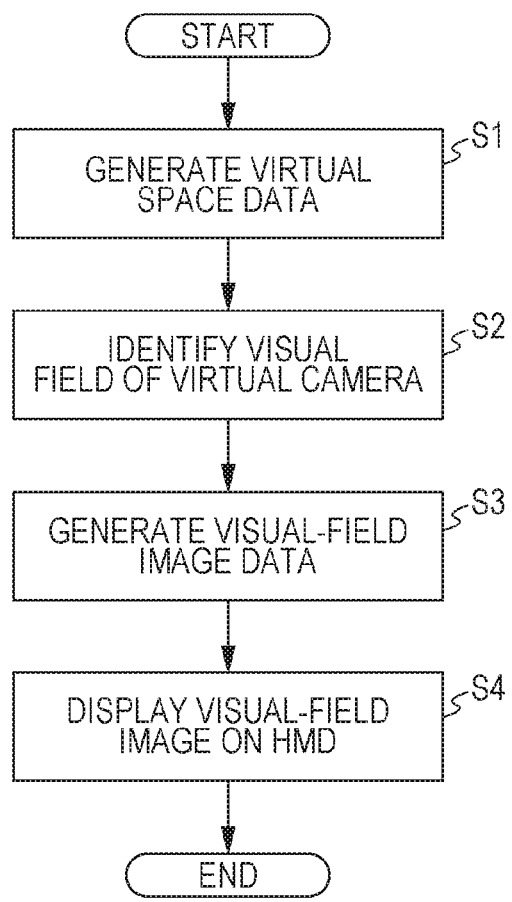
FIG. 4 A flowchart of processing of displaying a visual-field image on the HMD according to at least one embodiment of this disclosure.
Figure 5:
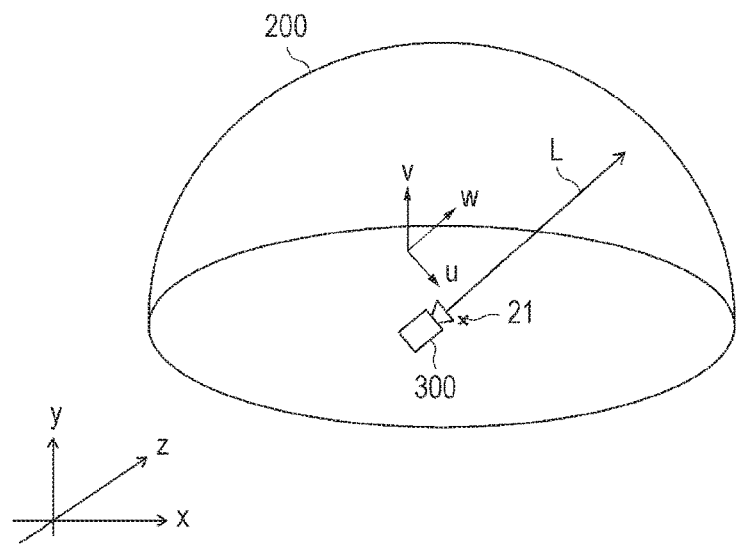
FIG. 5 An xyz spatial diagram of an example of a virtual space according to at least one embodiment of this disclosure.
Figure 6A:
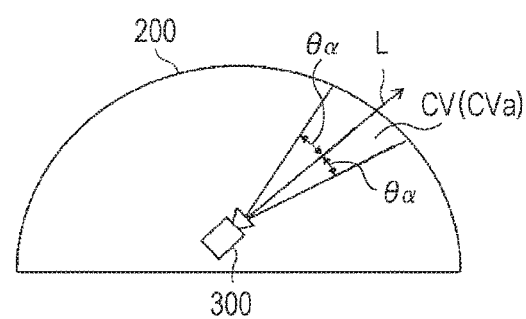
FIG. 6A A yx plane diagram of the virtual space in FIG. 5 according to at least one embodiment of this disclosure.
Figure 6B:
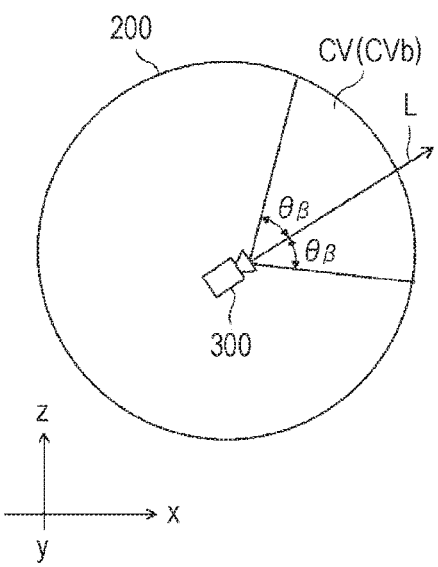
FIG. 6B A zx plane diagram of the virtual space in FIG. 5 according to at least one embodiment of this disclosure.

Next, with reference to FIG. 4 to FIG. 6, processing for displaying a visual-field image on the HMD 110 is described. FIG. 4 is a flow chart of the processing of displaying the visual-field image on the HMD 110 according to at least one embodiment of this disclosure. FIG. 5 is an xyz spatial diagram of an example of a virtual space 200 according to at least one embodiment of this disclosure. FIG. 6A is a yx plane diagram of the virtual space 200 in FIG. 5 according to at least one embodiment of this disclosure. FIG. 6B is a zx plane diagram of the virtual space 200 in FIG. 5 according to at least one embodiment of this disclosure.

In FIG. 4, in Step S1, the control unit 121 (refer to FIG. 3) generates virtual space data defining the virtual space 200 in which a virtual camera 300 is included. In FIG. 5 and FIGS. 6A-6B, the virtual space 200 is defined as an entire celestial sphere having a center position 21 as the center (in FIG. 5 and FIGS. 6A-6B, only the upper-half celestial sphere is included for clarity). Further, in the virtual space 200, an xyz coordinate system having the center position 21 as the origin is set. In an initial state of the HMD system 1, the virtual camera 300 is arranged at the center position 21 of the virtual space 200. The uvw coordinate system that defines the visual field of the virtual camera 300 is determined so as to synchronize with the uvw coordinate system that is defined about the head of the user U in the real space. Further, the virtual camera 300 may be moved in the virtual space 200 in synchronization with the movement of the user U wearing the HMD 110 in the real space.

Next, in Step S2, the control unit 121 identifies a visual field CV (refer to FIGS. 6A-6B) of the virtual camera 300. Specifically, the control unit 121 acquires information relating to the position and the inclination of the HMD 110 based on data representing the state of the HMD 110, which is transmitted from the position sensor 130 and/or the HMD sensor 114. Next, the control unit 121 determines the position and the direction of the virtual camera 300 in the virtual space 200 based on the information relating to the position and the inclination of the HMD 110. Next, the control unit 121 determines a reference line of sight L corresponding to the visual axis of the virtual camera 300 based on the position and the direction of the virtual camera 300, and identifies the visual field CV of the virtual camera 300 based on the determined reference line of sight L. In this case, the visual field CV of the virtual camera 300 matches a part of the region of the virtual space 200 that can be visually recognized by the user U wearing the HMD 110. In other words, the visual field CV matches a part of the region of the virtual space 200 to be displayed on the HMD 110. Further, the visual field CV has a first region CVa set as an angular range of a polar angle $\theta\alpha$ about the reference line of sight L in the xy plane in FIG. 6A, and a second region CVb set as an angular range of an azimuth angle $\theta\beta$ about the reference line of sight L in the xz plane in FIG. 6B.

As described above, the control unit 121 can identify the visual field CV of the virtual camera 300 based on the data transmitted from the position sensor 130 and/or the HMD sensor 114. In this case, when the user U wearing the HMD 110 moves, the control unit 121 can identify the visual field CV of the virtual camera 300 based on the data representing movement of the HMD 110, which is transmitted from the position sensor 130 and/or the HMD sensor 114. That is, the control unit 121 can move the visual field CV along with the movement of the HMD 110.

Next, in Step S3, the control unit 121 generates visual-field image data representing the visual-field image to be displayed on the display unit 112 of the HMD 110. Specifically, the control unit 121 generates the visual-field image data based on the virtual space data defining the virtual space 200 and the visual field CV of the virtual camera 300. That is, the visual field CV of the virtual camera 300 determines the range of virtual space data to be rendered as visual-field image data.

Next, in Step S4, the control unit 121 displays the visual-field image on the display unit 112 of the HMD 110 based on the visual-field image data. As described above, the visual field CV of the virtual camera 300 changes in accordance with the movement of the user U wearing the HMD 110, and thus a visual-field image V to be displayed on the HMD 110 changes as well. Thus, the user U can be immersed in the virtual space 200.

Figure 7:
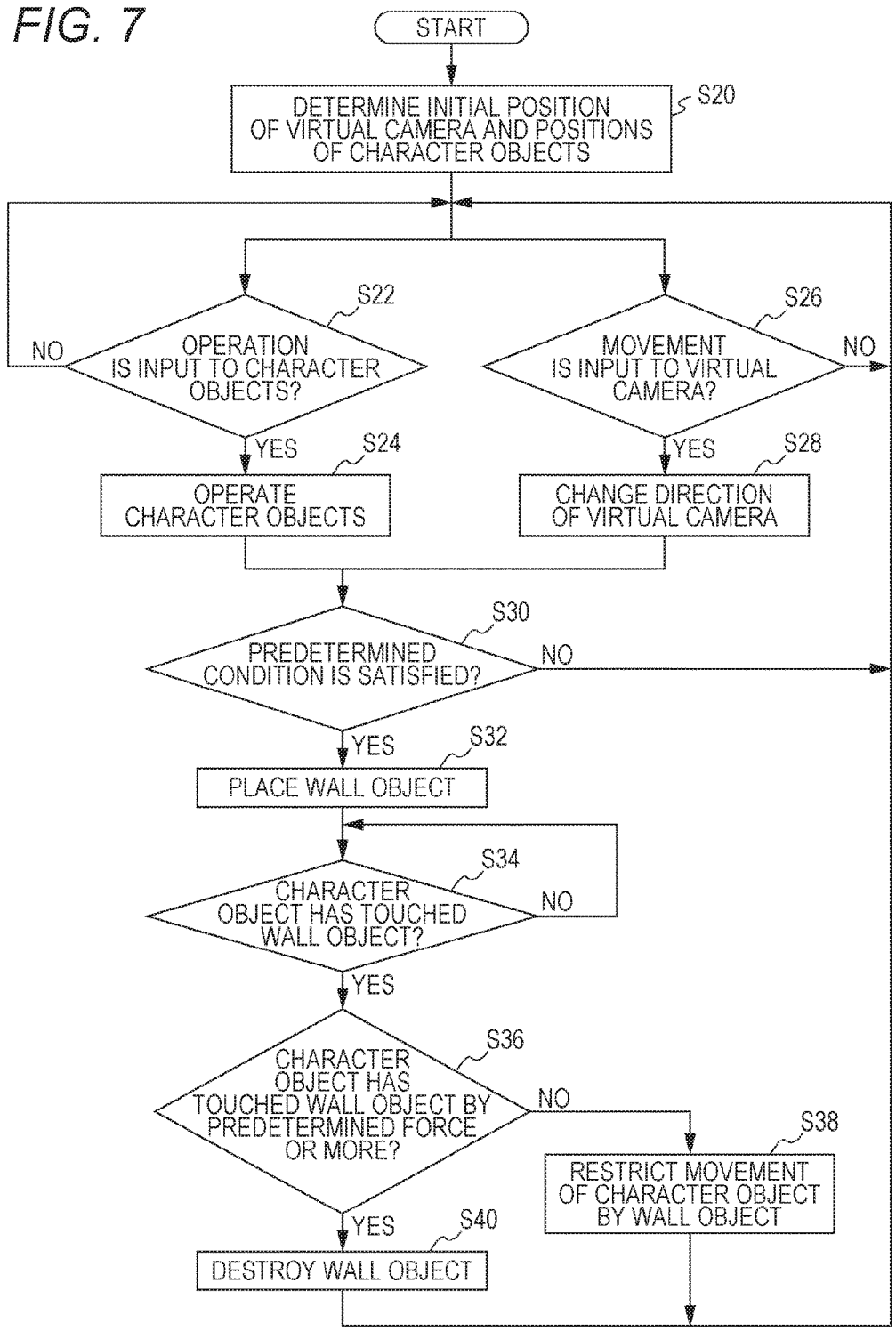
FIG. 7 A flowchart of a display control method according to at least one embodiment of this disclosure.
Figure 8A:
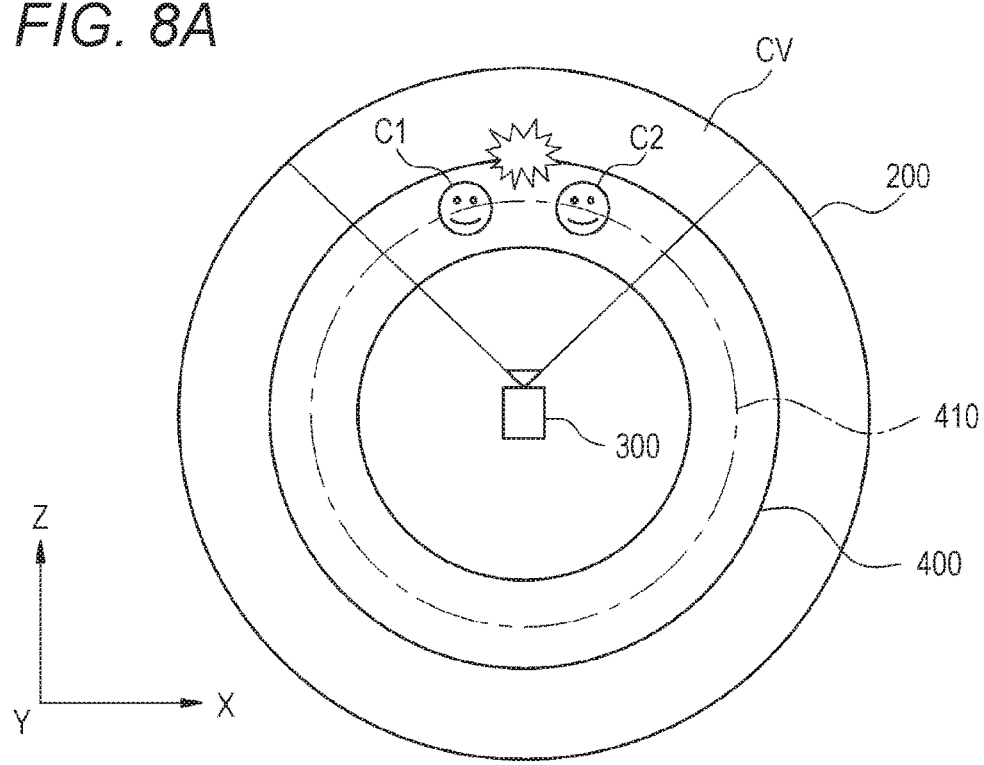
FIG. 8A A schematic diagram of a state of a virtual camera, a battle field, and character objects being placed in the virtual space according to at least one embodiment of this disclosure.
Figure 8B:
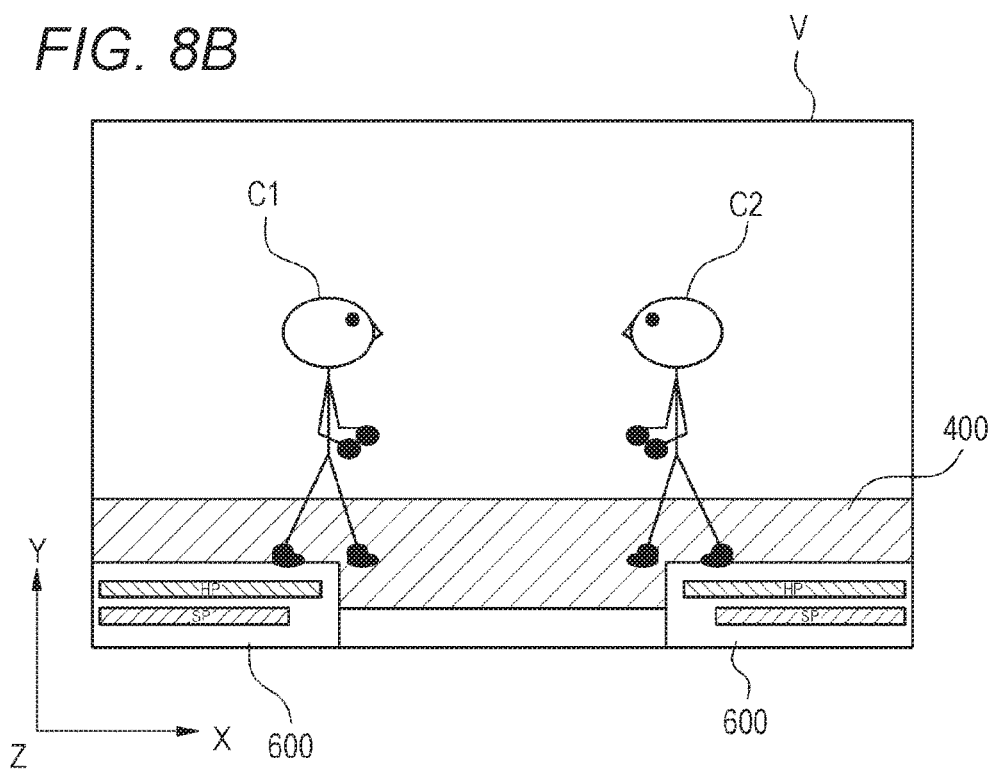
FIG. 8B A diagram of the visual-field image displayed on the HMD in the case of FIG. 8A according to at least one embodiment of this disclosure.
Figure 9A:
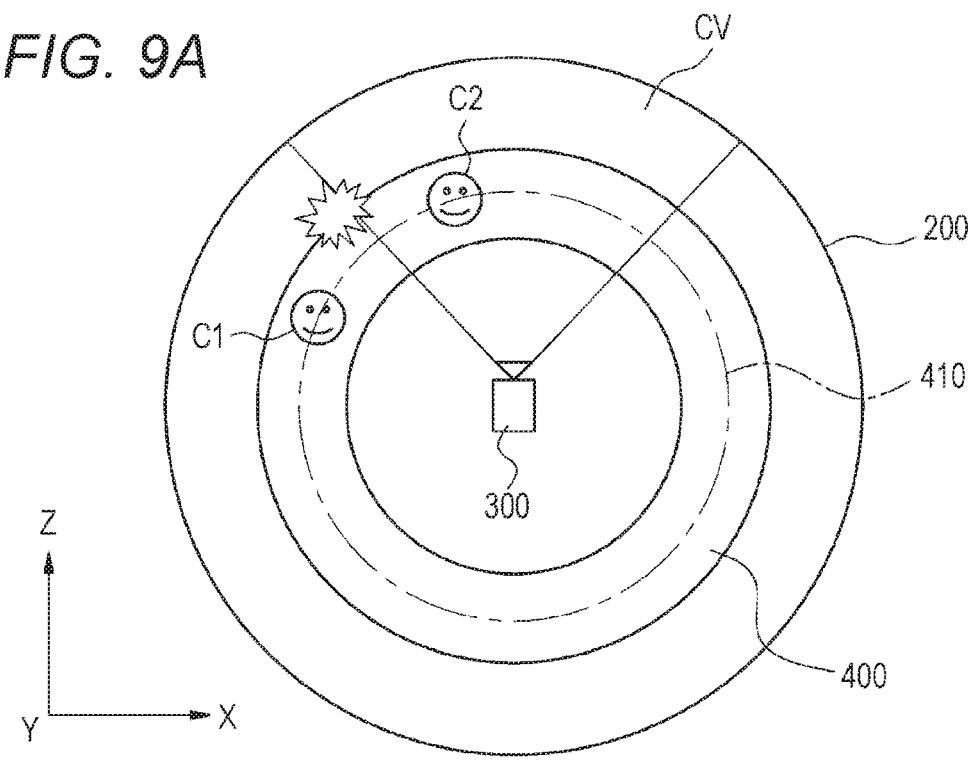
FIG. 9A A diagram of a state of the character objects moving in the battle field according to at least one embodiment of this disclosure.
Figure 9B:
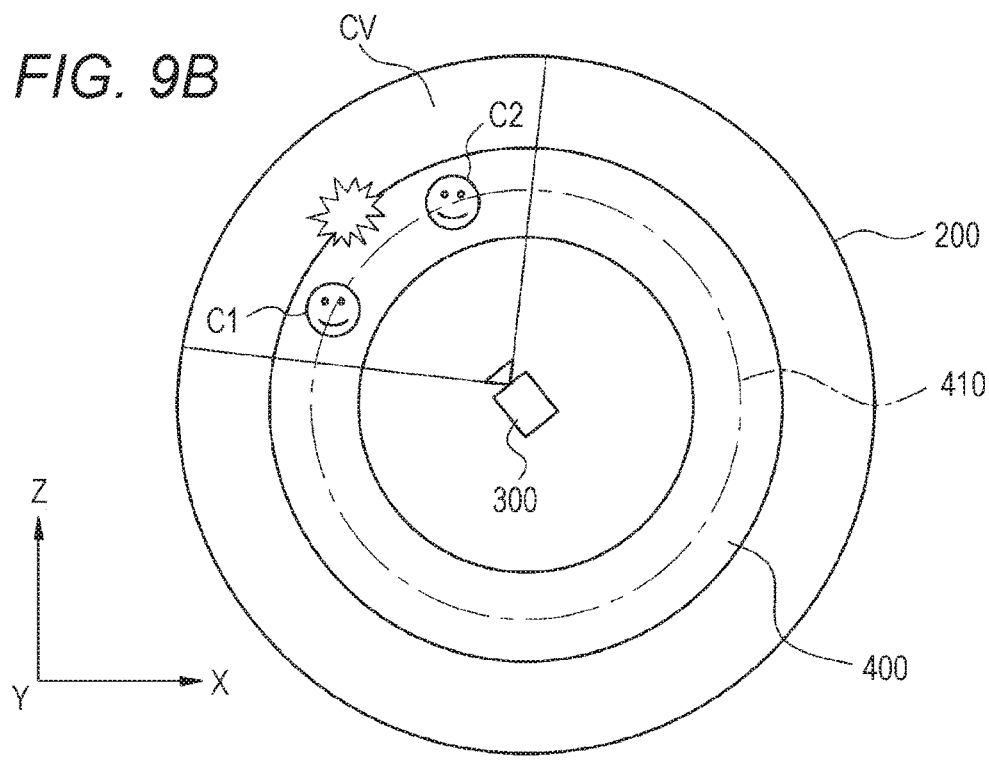
FIG. 9B A diagram of a state of the virtual camera moved so as to follow the moving character objects according to at least one embodiment of this disclosure.

Next, the display control method according to at least one embodiment is described with reference to FIG. 7 to FIGS. 9A-9B. FIG. 7 is a flowchart of the display control method according to at least one embodiment of this disclosure. FIG. 8A is a schematic diagram of a state of the virtual camera, a battle field, and character objects being placed in the virtual space according to at least one embodiment of this disclosure. FIG. 8B is a diagram of the visual-field image displayed on the HMD in the case of FIG. 8A according to at least one embodiment of this disclosure. FIG. 9A is a diagram of a state of the character objects moving in the battle field according to at least one embodiment of this disclosure. FIG. 9B is a diagram of a state of the virtual camera moved so as to follow the moving character objects according to at least one embodiment of this disclosure.

In FIG. 8A, the virtual space 200 according to at least one embodiment includes a virtual camera 300, a battle field 400 (example of field), and character objects C1 and C2. The control unit 121 generates virtual space data for defining the virtual space 200 containing those objects.

The battle field 400 is defined as a region surrounding the virtual camera 300 in the virtual space 200. In at least one embodiment, the battle field 400 is set so as to surround the virtual camera 300 at its initial position in a horizontal plane (xz plane in FIG. 8A) of the virtual space 200. In this example, the battle field 400 is formed in a circular shape and set about a vertical axis (Y axis) at the initial position of the virtual camera 300. The battle field 400 may be a shape that surrounds the virtual camera 300, and may be an ellipse or a polygon. The battle field 400 defines a movable range of the character objects C1 and C2. Further, a path 410, which is a circle of the battle field 400, is defined as the movement path of the character objects C1 and C2. The movement path 410 is formed, for example, on the circle (=((outer diameter)+(internal diameter))/2) of the battle field 400, but may be set at an arbitrary position in the radial direction of the battle field 400. Instead, the character objects C1 and C2 may be configured to move in any direction without provision of the movement path 410 as long as the character objects C1 and C2 are within the battle field 400.

In this example, the player character C1 is assumed to be an object operable by the user U wearing the HMD 110 among the character objects C1 and C2. Meanwhile, the opponent character C2 is assumed to be an object that is operated by another user in the case of a fighting game between users, or an object that is operated by the control apparatus 120 (control unit 121) in the case of a fighting game between the user and a computer. That is, the battle field 400 is formed to be a battle field in which the player character C1 and the opponent character C2 fight with each other in a competitive game, for example, a fighting game, and the player character C1 and the opponent character C2 fight with each other while moving along the movement path 410.

In FIG. 7, in Step S20, the control unit 121 determines the initial position of the virtual camera 300 and the positions of the character objects C1 and C2 within the battle field 400 so that the player character C1 and the opponent character C2 are contained in the visual field CV of the virtual camera 300 at the time of start of the competitive game.

The visual-field image V displayed on the display unit 112 of the HMD 110 under the state of Step S20 is in FIG. 8B. In FIG. 8B, the battle field 400 and the character objects C1 and C2 on the battle field 400 are displayed in the visual-field image V. Further, a fixed user interface (UI) image 600 containing gauges of hit point (HP) values and skill point (SP) values, which are consumed to use a killer move, of the character objects C1 and C2 are displayed at the predetermined position (lower part of screen) of the visual-field image V.

Next, in Step S22, the control unit 121 determines whether or not operation input to the character objects C1 and C2 is received. For example, when the user U operates the operation button of the external controller 320, the control unit 121 determines that operation input to the player character C1 is received. Specifically, the external controller 320 generates an instruction signal for instructing movement of the player character C1 in response to input operation by the user U on an operation button, and transmits the generated instruction signal to the control apparatus 120. Further, the control unit 121 determines whether or not operation input to the opponent character C2 is received separately from operation input to the player character C1.

In response to a determination that operation input to the player character C1 and/or the opponent character C2 is received (Yes in Step S22), in Step S24, the control unit 121 operates the character objects C1 and C2 based on the operation input. Specifically, the control unit 121 receives an instruction signal from the external controller 320 via the I/O interface 124, and operates the player character C1 based on the received instruction signal. Further, the control unit 121 operates the opponent character C2 based on an instruction signal from an external controller operated by another user or based on an instruction signal generated by the control unit 121 itself. For example, in FIG. 9A, when input operation for movement in the horizontal direction (X direction of FIG. 9A) is performed on the character objects C1 and C2, the control unit 121 moves the character objects C1 and C2 along a circumferential direction of the virtual camera 300 (along movement path 410).

Next, in Step S26, the control unit 121 determines whether or not the user U wearing the HMD 110 has moved, that is, whether or not movement is input to the virtual camera 300 in parallel to Step S22 (or after Step S24). Then, when the control unit 121 determines that movement is input to the virtual camera 300 (Yes in Step S26), in Step S28, in FIG. 9B, the direction of the virtual camera 300 is changed in the virtual space 200 based on the movement input. Specifically, the control unit 121 rotates the virtual camera 300 without changing the position thereof in synchronization with movement of the HMD 110. That is, the control unit 121 does not change the position of the virtual camera 300 but changes the direction of the virtual camera 300 in synchronization with movement of the HMD 110. In this manner, preventing or reducing visually induced motion sickness (so-called VR sickness) by changing the direction of the virtual camera 300 without changing the position thereof in synchronization with movement of the HMD 100 is possible.

Figure 10:
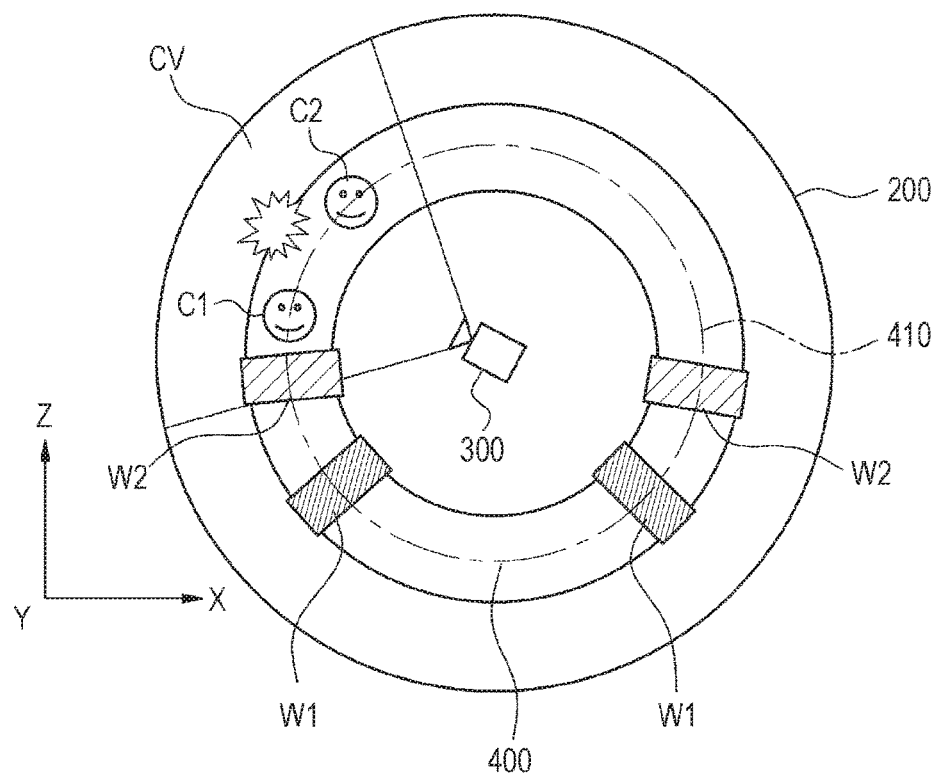
FIG. 10 A diagram of a state of wall objects being placed in the battle field according to at least one embodiment of this disclosure.

Next, in Step S30, the control unit 121 determines whether or not a predetermined condition is satisfied. Then, when the control unit 121 determines that the predetermined condition is not satisfied, the processing of the control unit 121 returns to Step S22 and/or Step S26. On the other hand, when the control unit 121 determines that a predetermined condition is satisfied (Yes in Step S30), in Step S32, in FIG. 10, the control unit 121 places a wall object W1 at a predetermined position in the battle field 400. The predetermined condition contains, for example, a type of the competitive game or an elapsed time in each round of the competitive game. That is, the wall object W1 may be placed in the battle field 400 in advance depending on the type of the game, or the wall object W1 may be placed in the battle field 400 after a predetermined period of time has elapsed since start of the competition round.

Figure 11A:
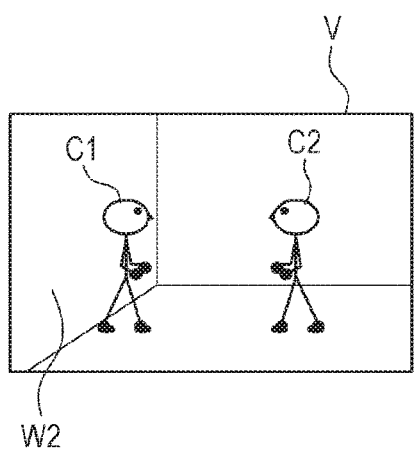
FIG. 11A A diagram of the visual-field image in the case of FIG. 10 according to at least one embodiment of this disclosure.

The wall object W1 is preferably placed on a side (rear side of the virtual camera 300) opposite to a direction of the visual field of the virtual camera 300 with respect to the initial position of the virtual camera 300. The user U has a difficulty in viewing the rear side of the virtual camera 300 with respect to the initial position, and thus it is convenient to ruin the battle field 400 on the rear side. Further, the control unit 121 may change the position of the wall object W1 or place a new wall object W2 (FIG. 10) depending on the level of the competitive round or the elapsed time in one round. When the direction of the virtual camera 300 is changed so that the virtual camera 300 contains the wall object W2 in the visual field CV thereof, in FIG. 11A, the wall object W2 is displayed in the visual-field image.

Next, in Step S34, the control unit 121 determines whether or not at least one of the player character C1 or the opponent character C2 has touched the wall object W1 or W2. Then, when the control unit 121 determines that at least one of the character objects C1 and C2 has touched the wall object W1 or W2 (Yes in Step S34), in Step S36, the control unit 121 determines whether or not the at least one of the character objects C1 or C2 has touched the wall object W1 or W2 by a predetermined force or more. Then, when the control unit 121 determines that the at least one of the character objects C1 and C2 has not touched the wall object W1 or W2 by a predetermined force or more (No in Step S36), in Step S38, the control unit 121 restricts movement of the character objects C1 and C2 so that those character objects C1 and C2 cannot move forward past the wall object W1 or W2. That is, the movable range of the character objects C1 and C2 is restricted by placing the wall objects W1 and W2 in the battle field 400.

Figure 11B:
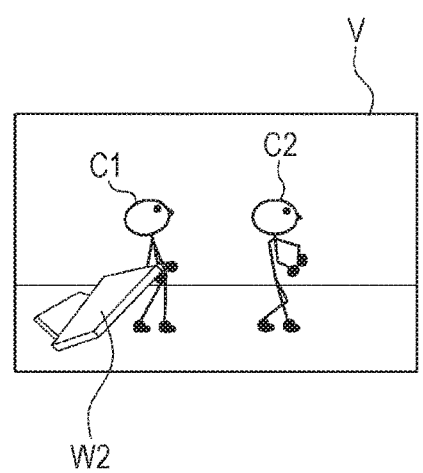
FIG. 11B is a diagram for illustrating the visual-field image obtained when a wall object is destroyed according to at least one embodiment of this disclosure.

On the other hand, when the control unit 121 determines that the at least one of the character objects C1 or C2 has touched the wall object W1 or W2 by a predetermined force or more (Yes in Step S36), in Step S40, the control unit 121 destroys the wall object W1 or W2. For example, in FIG. 11B, when the opponent character C2 attacks the player character C1 and the player character C1 has touched (collided with) the wall object W2 by a predetermined force or more, the wall object W2 is destroyed. With this, restriction on movement of the character objects C1 and C2 by the wall object W2 is canceled.

As described above, according to at least one embodiment, the control unit 121 forms the battle field 400 for defining the movable range of the character objects C1 and C2 so that the battle field 400 surrounds the virtual camera 300 at the initial position of the virtual camera 300, and moves the character objects C1 and C2 in the battle field 400 based on predetermined movement input. With this, the user is provided with an experience common in the VR space while securing the operation feeling of the related-art game.

Further, as described in Step S24, the character objects C1 and C2 are moved in the circumferential direction of the virtual camera 300 depending on a lateral-direction component of movement input. In this manner, the character objects C1 and C2 move in such a manner as to form an arc with the user U wearing the HMD 110 as a center of the arc. Therefore, the user U is provided with a novel experience only possible in the VR.

Further, as described in Step S32, when a predetermined condition is satisfied, the wall objects W1 and W2 for further restricting the movable range of the character objects C1 and C2 are placed in the battle field 400. In this manner, game enjoyment is enhanced and the user is provided with an experience common in the VR space by narrowing the movable range of the player character C1 and the opponent character C2 depending on the type of the game or the elapsed time in the competitive round. Further, the user is provided with an experience common in the VR space, for example, an experience of a safety zone for the character objects C1 and C2 being gradually reduced depending on the level of the competitive round or the elapsed time in one round through addition of a new wall object or change of the position of the wall object.

In this manner, the user is provided with a so-called infinite field in which the character objects C1 and C2 can move in a circumferential direction infinitely at the time of start of a round by placing wall objects in the battle field 400 along with, for example, progress of the round. Further, the user U, who is a player, is provided with an option to chase up the opponent character C2 against a wall object or to prevent the player character C1 from being chased up against a wall object when those wall objects are placed along with elapse of time in a round. As described above, the battle field 400 in this case is set so as to surround the virtual camera 300. With this, even when wall objects are placed in the infinite field, the player can easily grasp the movable range of the character objects C1 and C2 through rotation of the virtual camera 300 about a vertical axis (Y-axis). That is, when wall objects are placed in the battle field 400, the player can easily recognize the size of the movable range of the character objects C1 and C2 as a range of rotating the virtual camera 300 about the vertical axis (Y-axis).

Figure 12:
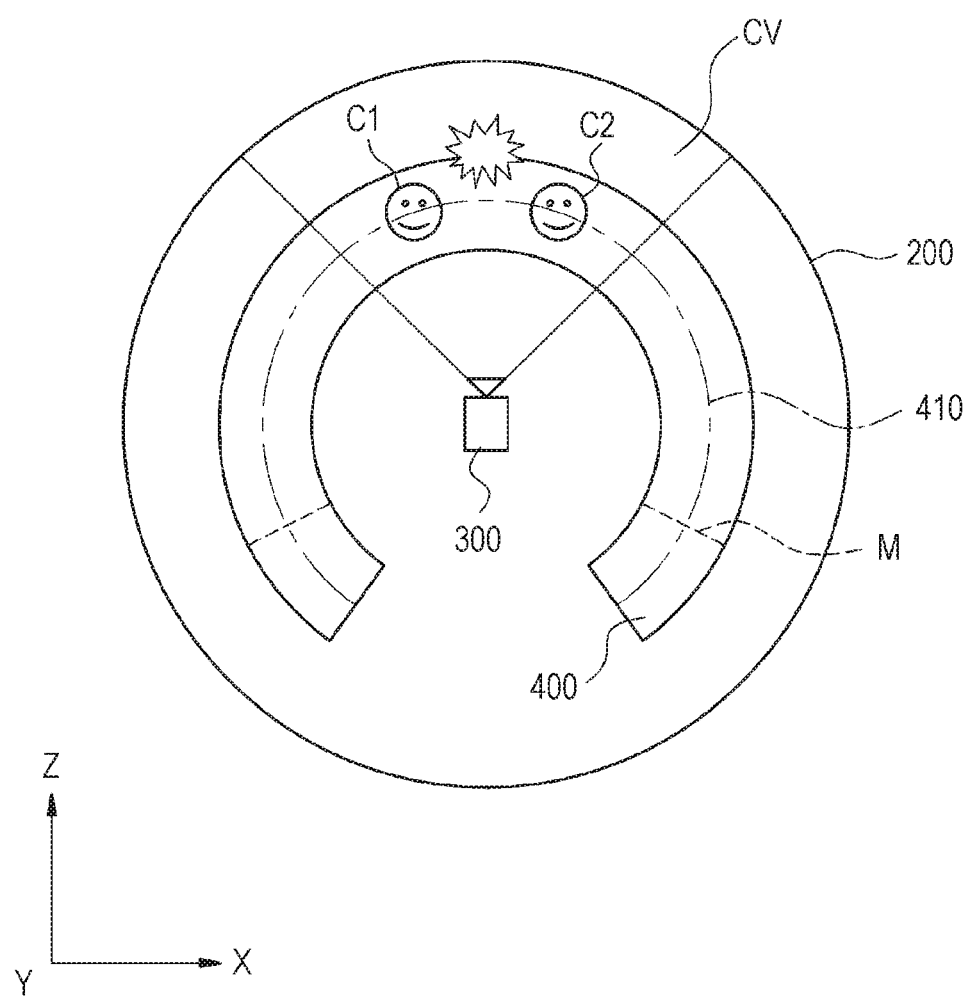
FIG. 12 A diagram of a state of a shape of the battle field being changed according to at least one embodiment of this disclosure.

In at least one embodiment described above, the control unit 121 sets the wall objects W1 and W2 in the battle field 400 to restrict the movable range of the character objects C1 and C2, but the manner of restricting the movable range is not limited to this example. For example, in FIG. 12, the movable range of the character objects C1 and C2 may be restricted by changing the shape of the battle field 400. At this time, as indicated by the broken line M, the shape of the battle field 400 may be gradually reduced depending on, for example, the level of the competitive round or the elapsed time in one round.

Figure 14A:
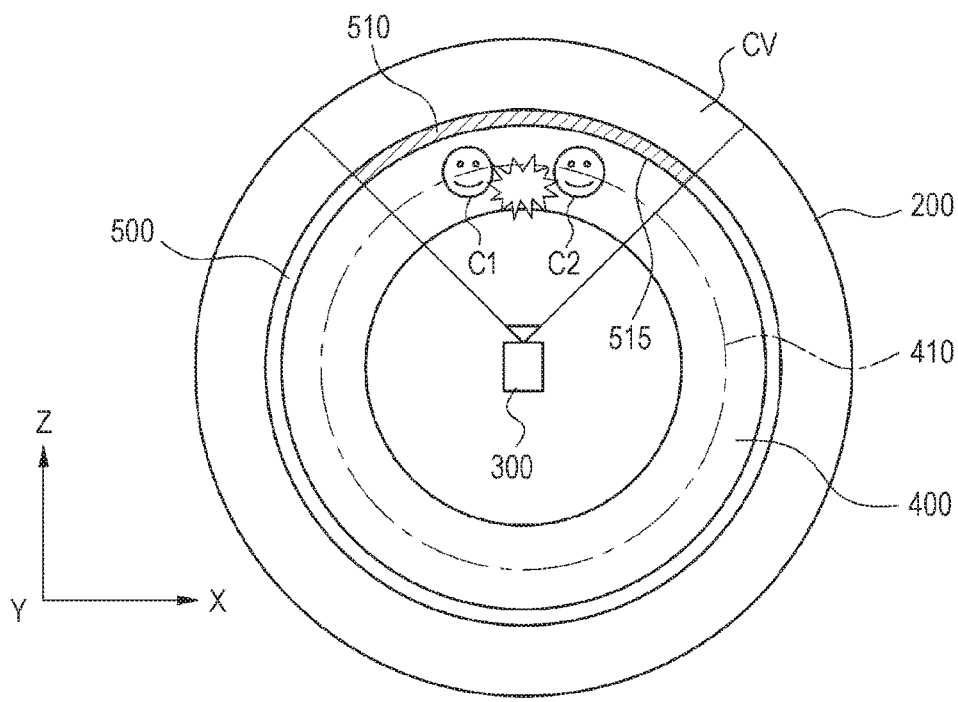
FIG. 14A A schematic diagram of a state of display objects being placed in association with the battle field according to at least one embodiment of this disclosure.
Figure 14B:
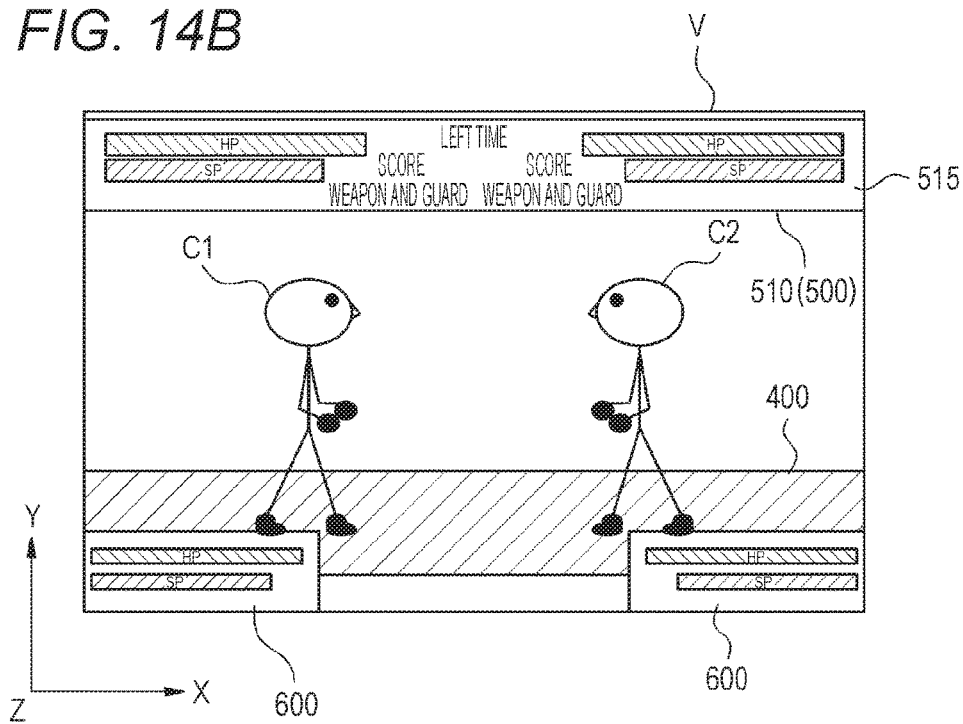
FIG. 14 A diagram of the visual-field image in the case of FIG. 14A according to at least one embodiment of this disclosure.
Figure 15A:
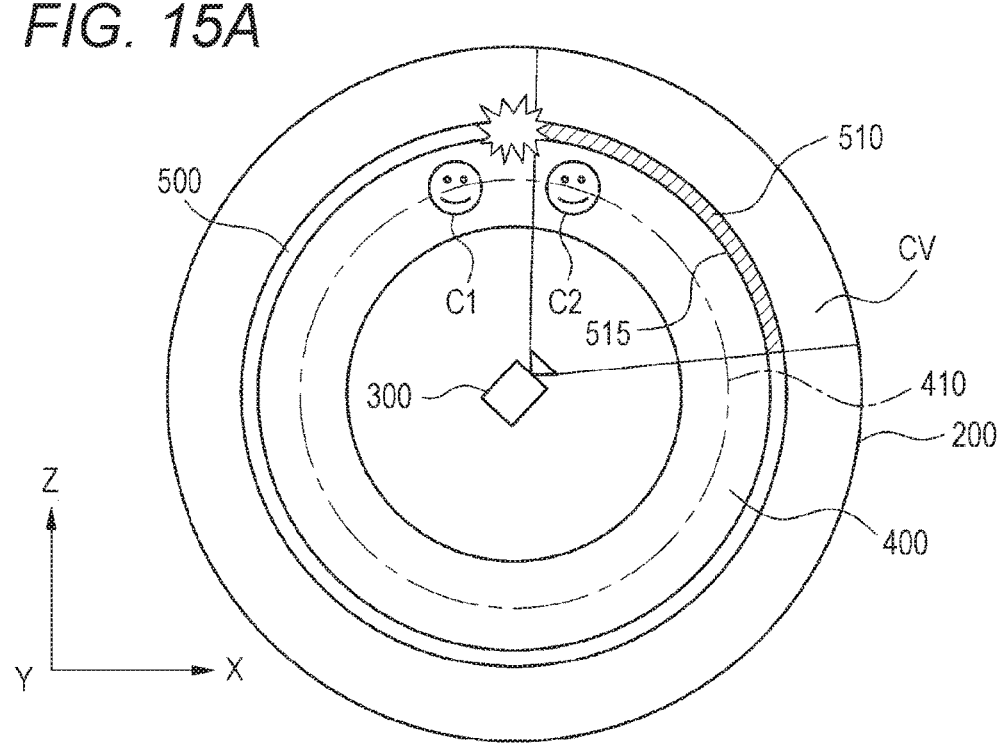
FIG. 15A A diagram of a direction of the virtual camera being changed in the horizontal direction from FIG. 14A according to at least one embodiment of this disclosure.
Figure 15B:
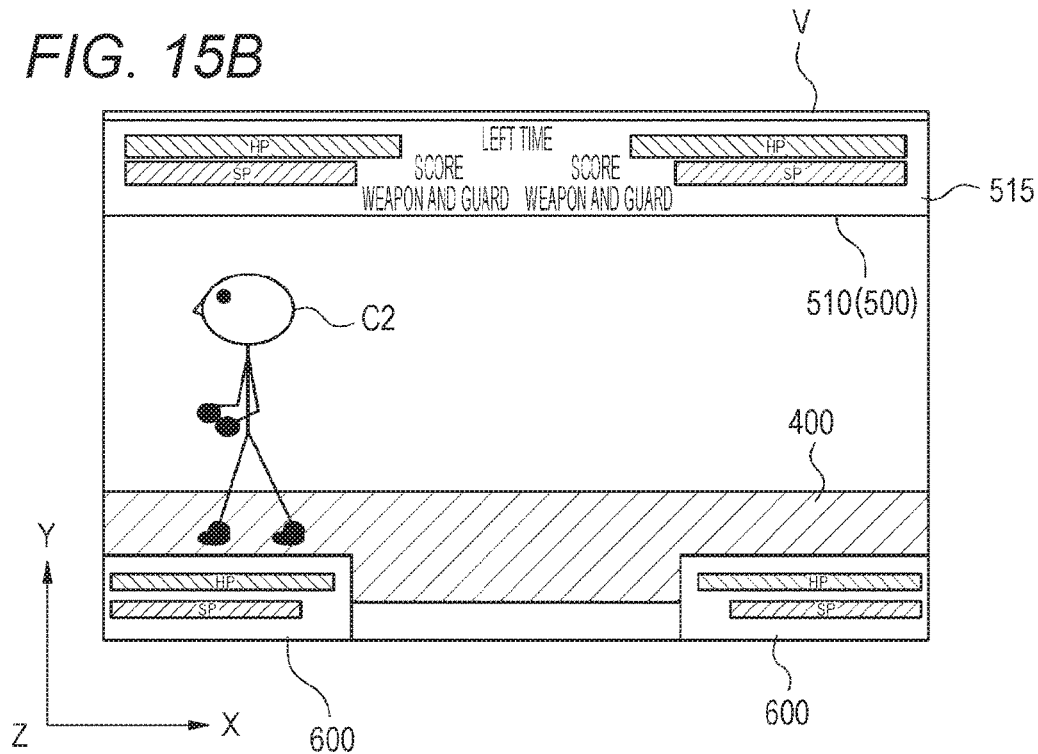
FIG. 15 A diagram of the visual-field image in the case of FIG. 15A according to at least one embodiment of this disclosure.
Figure 16:
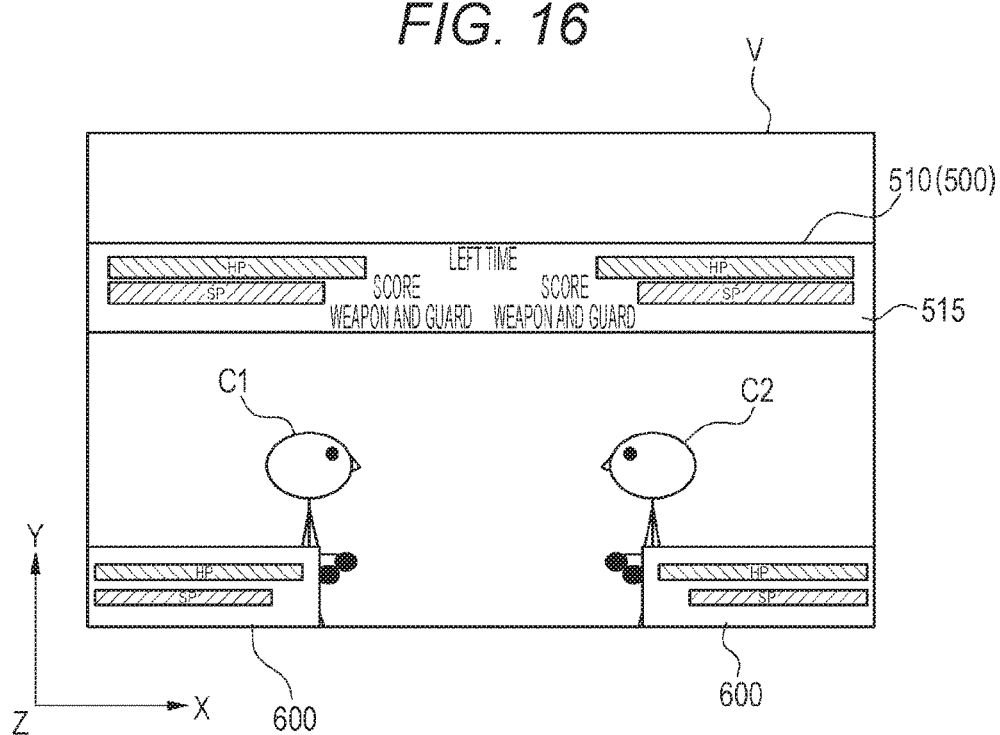
FIG. 16 A diagram of the visual-field image obtained when the direction of the virtual camera has changed in an upward direction from a direction of FIG. 14A according to at least one embodiment of this disclosure.

Next, the display control method according to at least one embodiment is described with reference to FIG. 13 to FIG. 16. FIG. 13 is a flowchart of the display control method according to at least one embodiment of this disclosure. FIG. 14A is a schematic diagram of a state of display objects being placed in association with the battle field according to at least one embodiment of this disclosure. FIG. 14B is a diagram of the visual-field image in the case of FIG. 14A according to at least one embodiment of this disclosure. FIG. 15A is a diagram of the direction of the virtual camera being changed in the horizontal direction from FIG. 14A according to at least one embodiment of this disclosure. FIG. 15B is a diagram of the visual-field image in the case of FIG. 15A according to at least one embodiment of this disclosure. FIG. 16 is a diagram of the visual-field image obtained when the direction of the virtual camera has changed in an upward direction from the direction of FIG. 14A according to at least one embodiment of this disclosure.

In FIG. 14A, the virtual space 200 according to the second embodiment includes the virtual camera 300, a battle field 400, character objects C1 and C2, and a user interface object 500 (hereinafter referred to as "UI object"; the UI object is an example of the target object). The control unit 121 generates virtual space data for defining the virtual space 200 containing those objects. The virtual camera 300, the battle field 400, and the character objects C1 and C2 have a configuration similar to that of the first embodiment, and thus a detailed description thereof is omitted here.

The UI object 500 is placed so as to surround the virtual camera 300 in the virtual space 200. Specifically, the UI object 500 is placed at an outer peripheral portion of the battle field 400, which is set so as to surround the virtual camera 300. This UI object 500 is preferably placed above the battle field 400 by a predetermined height in the Y-axis direction.

In FIG. 13, in Step S50, the control unit 121 determines the initial position of the virtual camera 300 and the positions of the character objects C1 and C2 in the battle field 400 so that the character objects (player character C1 and opponent character C2) and the UI object 500 are contained in the visual field CV at the initial position of the virtual camera 300 at the time of start of the competitive game. Next, in Step S52, the control unit 121 places a display object 510 along the UI object 500 within a region contained in the visual field CV at the initial position of the virtual camera 300. A texture 515 containing various kinds of information is mapped to a surface of the display object 510 opposing the virtual camera 300.

The visual-field image V displayed on the display unit 112 of the HMD 110 in Step S52 is in FIG. 14B.

In FIG. 14B, the battle field 400 and the character objects C1 and C2 on the battle field 400 are displayed in the visual-field image V, and the UI object 500 and the texture 515 mapped to the display object 510 placed along the UI object 500 are displayed. The UI object 500 is displayed in an upper part of the visual-field image V at the initial position of the virtual camera 300, for example, as a circular electronic bulletin board surrounding the user U. The shape of the UI object 500 is not limited to the example of at least one embodiment, but various kinds of modes may be adopted as the shape of the UI object 500. The texture 515 mapped to the surface of the display object 510 contains various kinds of information such as the HP values and SP values of the character objects C1 and C2, a left time of the round, a score, and a weapon and guard. The fixed UI image 600 containing, for example, the HP value and SP value is displayed in a lower part of the visual-field image V. Unlike the UI object 500, the fixed UI image 600 is always displayed in a fixed manner at a predetermined position of the visual-field image V during a battle between the player character C1 and the opponent character C2.

Next, in Step S54, the control unit 121 determines whether or not operation input to the player character C1 and/or the opponent character C2 is received. In response to a determination that operation input to the player character C1 and/or the opponent character C2 is received (Yes in Step S54), in Step S56, the control unit 121 operates the character objects C1 and C2 based on the operation input. Similarly to the description above, when input operation for movement in the horizontal direction (X direction of FIG. 9A) is performed on the character objects C1 and C2, the control unit 121 moves the character objects C1 and C2 along the circumferential direction of the virtual camera 300 in the battle field 400 (see FIG. 9A). Then, the control unit 121 returns the processing to Step S54.

In Step S58, the control unit 121 determines whether or not movement is input to the virtual camera 300 in parallel to Step S54 (or after Step S56). Then, when the control unit 121 determines that movement is input to the virtual camera 300 (Yes in Step S58), in Step S60, in FIG. 15A, the direction of the virtual camera 300 is changed with the position of the virtual camera 300 being fixed in the virtual space 200 based on the movement input. That is, the virtual camera 300 changes only its direction without changing its position in synchronization with movement of the HMD 110. With this, preventing or reducing visually induced motion sickness (so-called VR sickness) of the user U is possible.

Next, in Step S62, the control unit 121 changes the position of the display object 510 placed along the UI object 500 so that the texture 515 is displayed within the visual field CV of the virtual camera 300 in accordance with the direction of the virtual camera 300 changed in Step S60. Display of the visual-field image V at this time is in FIG. 15B. In FIG. 15B, the control unit 121 moves the position of the display object 510 along the UI object 500 so that the position follows movement of the virtual camera 300. With this, the texture 515 is always displayed within the visual field CV of the virtual camera 300.

In this example, the UI object 500 is placed so as to extend in the horizontal direction above the battle field 400 by a predetermined length. Thus, when the direction of the virtual camera 300 is changed from the initial position in the vertical direction (Y-axis direction) in synchronization with movement of the HMD 110, in FIG. 16, the texture 515 is displayed along the UI object 500 under a state in which the position of the UI object 500 is moved to a lower part of the visual-field image V. In this manner, the position (namely, the display position of the texture 515) of the display object 510 does not move in synchronization with change in direction of the virtual camera 300 in the Y-axis direction. That is, in Step S52, the control unit 121 performs control so as to move the display position of the texture 515 based on movement of the HMD 110 about a yaw axis (v axis) and so as not to move the display position of the texture 515 based on movement of the HMD 110 about a roll axis (w axis) and a pitch axis (u axis).

Figure 17:
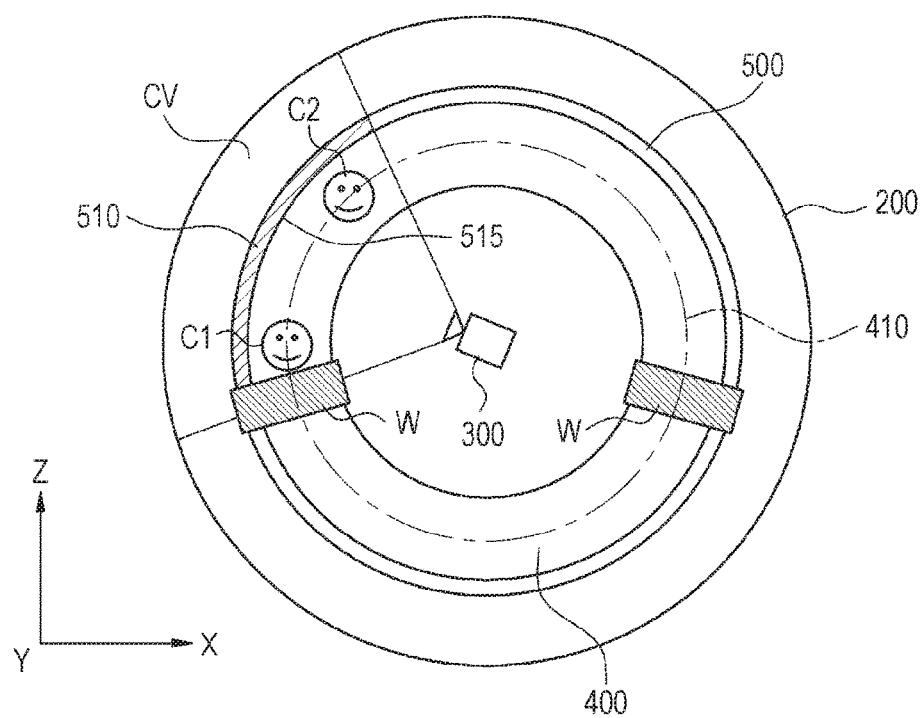
FIG. 17 A schematic diagram of a state of wall objects being placed in the battle field in FIG. 14A according to at least one embodiment of this disclosure.

Next, in Step S64, the control unit 121 determines whether or not a predetermined condition containing the type of the competitive game or the elapsed time in each round of the competitive game is satisfied. Then, in response to a determination that the predetermined condition is satisfied (Yes in Step S64), in Step S66, the control unit 121 places wall objects W at predetermined positions within the battle field 400 as illustrated in FIG. 17. Then, the control unit 121 returns processing to Step S54 and Step S58.

The wall objects W are preferably placed not only in the battle field 400 but also in the UI object 500. With this, the movable range of the player character C1 and the opponent character C2 is changed, and the position of movement of the display object 510 along the UI object 500 is restricted. Similarly to the above description, the control unit 121 may change the positions of the wall objects W and place new wall objects different from the wall objects W depending on the level of the competitive round or the elapsed time in one round. Further, as in Step S40 of the first embodiment, when at least one of the character objects C1 and C2 has touched the wall object W by a predetermined force or more, the control unit 121 may perform control so that the wall objects W are destroyed.

As described above, according to at least one embodiment, the control unit 121 places the UI object 500 for defining the position of the display object 510 capable of displaying the texture 515 containing predetermined information so that the UI object 500 surrounds the virtual camera 300 at the initial position of the virtual camera 300, and moves the position (display position of the texture 515) of the display object 510 along the UI object 500 so that the position follows movement of the virtual camera 300. With this, the user U wearing the HMD 110 can always recognize the texture 515 moving in synchronization with his or her movement. Further, when the UI object 500 is formed of a board (electronic bulletin board) in the virtual space 200, the user U can recognize the texture 515 in such a manner as to fit view of the world in the virtual space 200. With this, the user is provided with an experience common in the VR space.

Further, as described in Step S52, the control unit 121 performs control so as to move the display position of the texture 515 based on movement of the HMD 110 about the yaw axis (v axis) and so as not to move the display position of the texture 515 based on movement of the HMD 110 about the roll axis (w axis) and the pitch axis (u axis). With this, controlling a change in display position of the texture 515 while reducing the amount of detection data necessary for reflecting movement of the HMD 110 in movement of the virtual camera 300 is possible.

Further, as described in Step S50, the virtual camera 300 changes direction without changing position in synchronization with movement of the HMD 110. In this manner, even when the display position of the texture 515 is controlled only based on movement of the HMD 110 about the roll axis, information displayed along the UI object 500 moves naturally by fixing the position of the virtual camera 300.

Further, as described in Steps S54 and S56, the control unit 121 places the wall objects W in the virtual space 200 so as to restrict movement of the player character C1 and the opponent character C2 in a predetermined direction in the battle field 400, and restrict the position at which the texture 515 is allowed to be displayed in accordance with restriction on movement of the character objects C1 and C2 in the predetermined direction. The user U is provided with feedback on the magnitude of the battle field 400 by restricting the display position of the texture 515 in synchronization with decrease in moveable range of the character objects C1 and C2.

For example, when a predetermined condition is satisfied in accordance with the situation of the game, at least a part of information contained in the texture 515 may be inhibited from following movement of the virtual camera 300. For example, when the battle field 400 is reduced, display of a part of information contained in the texture 515 is inhibited from following movement of the virtual camera 300, to thereby allow the user U to recognize that the battle field 400 is reduced.

Further, in at least one embodiment, the display object 510 for which various kinds of information are mapped to the texture 515 is moved along the UI object 500 to move the display position of the texture 515, but the manner of mapping is not limited to this example. For example, the texture may be directly mapped to the UI object 500 and the mapping position of this texture on the UI object 500 may be changed to move the display position of the texture.

The above description of embodiments is not to be read as a restrictive interpretation of the technical scope of this disclosure. The embodiments are merely given as examples, and it is to be understood by a person skilled in the art that various modifications can be made to the embodiments within the scope of this disclosure set forth in the appended claims. Thus, the technical scope of this disclosure is to be defined based on the scope of this disclosure set forth in the appended claims and an equivalent scope thereof.

In order to achieve various types of processing to be executed by the control unit 121 by software, a display control program for executing a display control method according to each of the embodiments on a computer (processor) may be installed in advance into the storage unit 123 or the ROM. Alternatively, the display control program may be stored in a computer-readable storage medium, for example, a magnetic disk (HDD, or floppy disk), an optical disc (e.g., CD-ROM, DVD-ROM, or Blu-ray (R) disc), a magneto-optical disk (e.g., MO), and a flash memory (e.g., SD card, USB memory, and SSD). In this case, the storage medium is connected to the control device 120, and thus the program stored in the storage medium is installed into the storage unit 123. Then, the display control program installed in the storage unit 123 is loaded onto the RAM, and the processor executes the loaded program. In this manner, the control unit 121 executes the display control method according to at least one embodiment.

Further, the display control program may be downloaded from a computer on the communication network 3 via the communication interface 125. Also in this case, the downloaded program is similarly installed into the storage unit 123.

[Supplementary Note 1]

Now, an outline of at least one embodiment of this disclosure is described.

(1) A display control method, which is executed by a system including a head-mounted display, includes generating virtual space data for defining a virtual space containing a virtual camera and a character object. The method further includes displaying a visual-field image on the head-mounted display based on a visual field of the virtual camera and the virtual space data. The method further includes updating the visual-field image by changing a direction of the virtual camera based on movement of the head-mounted display. The method further includes forming a field for defining a peripheral direction in which the character object is movable so that the field surrounds the virtual camera at an initial position of the virtual camera. The method further includes moving the character object in the field based on predetermined movement input.

According to the method described above, the user is provided with an experience common in the VR space while securing the operation feeling of the related-art game.

(2) In at least one embodiment, moving the character object includes moving the character object in the peripheral direction in accordance with a lateral-direction component of the predetermined movement input.

According to the method described above, the user U is provided with a novel experience only possible in the VR because, for example, the character object moves in such a manner as to form an arc with the user wearing the HMD as its center.

(3) The method further includes restricting a movable range of the character object when a predetermined condition is satisfied.

According to the method described above, game enjoyment is enhanced by further narrowing the movable range of the character object depending on the situation.

(4) The display control method may include a method for playing a competitive game formed of at least one round, and the predetermined condition may include a type of the competitive game or an elapsed time in the at least one round.

Game enjoyment is enhanced and user is provided with an experience common in the VR space by narrowing the movable range of the character object depending on, for example, the type of the game or the elapsed time in the round.

(5) In at least one embodiment, restricting the movable range of the character object includes changing the movable range of the character object depending on a level of a round or an elapsed time in one round.

The user is provided with an experience common in the VR space, for example, an experience of the safety zone for the character object being gradually reduced depending on the level of the round or the elapsed time in one round.

(6) In at least one embodiment, restricting the moveable range of the character object includes restricting the movable range of the character object by placing a wall object in the field.

(7) In at least one embodiment, restricting the moveable range of the character includes restricting the movable range of the character object by changing a shape of the field.

According to those methods, restricting the movable range of the character object is easily achieved.

(8) In at least one embodiment, updating the visual-field image includes changing the direction of the virtual camera without changing a position of the virtual camera in synchronization with the movement of the head-mounted display.

According to the method described above, preventing or reducing visually induced motion sickness (so-called VR sickness) even when the direction of the virtual camera is changed in synchronization with movement of the HMD because the position of the virtual camera is not changed is possible.

(9) The character object may be prohibited from moving in a depth direction of the visual-field image in the field.

According to the method described above, the operation feeling is similar to that of a related-art 2D fighting game because the character object does not move in the depth direction of the visual-field image.

(10) A system according to at least one embodiment of this disclosure for executing the display control method of any one of Items (1) to (9) includes a computer.

According to this configuration, a system capable of providing the user with an experience common in the VR space while securing the operation feeling of the related-art game is possible.

[Supplementary Note 2]

(11) A display control method, which is executed by a system including a head-mounted display, includes generating virtual space data for defining a virtual space containing a virtual camera. The method further includes displaying a visual-field image on the head-mounted display based on a visual field of the virtual camera and the virtual space data. The method further includes updating the visual-field image by moving the virtual camera based on movement of the head-mounted display. The method further includes arranging a target object capable of displaying predetermined information so that the target object surrounds the virtual camera at an initial position of the virtual camera. The method further includes moving a display position of the information along the target object so that the display position follows movement of the virtual camera.

According to the method described above, various kinds of information, for example, a user interface, are displayed in the visual-field image by a method common in the VR space.

(12) In at least one embodiment, moving the display position comprises moving the display position based on movement of the head-mounted display about a yaw axis; and avoiding moving the display position based on movement about a roll axis and a pitch axis of the head-mounted display.

According to the method described above, a display position of information is controlled while reducing an amount of detection data necessary for grasping movement of the head-mounted display.

(13) In at least one embodiment, updating the visual-field image includes changing the direction of the virtual camera without changing a position of the virtual camera in synchronization with the movement of the head-mounted display.

According to the method described above, even when the method (12) described above is adopted, information is displayed along the target object to move naturally by fixing the position of the virtual camera. Further, preventing or reducing visually induced motion sickness (so-called VR sickness) is possible even when the direction of the virtual camera is changed in accordance with movement of the head-mounted display because the position of the virtual camera is not changed.

(14) The information may contain information associated with a character object moving in the virtual space based on predetermined movement input.

The user is provided with an experience common in the VR space by synchronizing display of information, for example, various kinds of parameters relating to the character object, with movement of the head-mounted display.

(15) In at least one embodiment, the method further includes forming a field for defining a movable range of the character object in association with the target object. The information may contain information associated with the field.

According to the method described above, the display position of information on the character object and the field are changed in synchronization with movement of the head-mounted display, which follows movement of the character object in the field.

(16) In at least one embodiment, the method further includes restricting movement of the character object in a predetermined direction in the field. The method further includes restricting a position at which the information is allowed to be displayed along the target object in accordance with movement of the character object in the predetermined direction.

According to the method described above, the user U is provided with feedback on the magnitude of the field by restricting the display position of the information in synchronization with decrease in moveable range of the character object.

(17) In at least one embodiment, the method further includes inhibiting at least a part of the information not from following movement of the virtual camera when a predetermined condition is satisfied.

For example, when the field is reduced, display of information is inhibited from following movement of the virtual camera, to thereby allow the user to recognize that the field is reduced.

(18) In at least one embodiment, moving the display position includes moving the display position by changing the position at which the information is mapped to the target object as a texture.

(19) In at least one embodiment, moving the display position includes moving the display position by moving a display object to which the information is mapped as a texture along the target object.

According to those methods, easily changing the display position of various kinds of information in synchronization with movement of the head-mounted display is possible.

(20) A system for executing the display control method of any one of Items (11) to (19) includes a computer.

According to this configuration, a system capable of displaying various kinds of information, for example, a user interface, in the visual-field image by a method common in the VR space is provided.

The invention claimed is:

1. A method comprising:
defining a virtual space including a virtual camera, a character object, and a field in which the character object is movable, the field defining a peripheral direction and surrounding the virtual camera along the peripheral direction;
defining a visual field of the virtual camera;
displaying a visual-field image on a head-mounted display based on the visual field and the virtual space;
detecting a movement input including a lateral-direction component, the lateral-direction being different from the peripheral direction;
moving the character object in the field along the peripheral direction in response to the lateral-direction component of the movement input;
detecting movement of the head-mounted display; changing a direction of the virtual camera based on detected movement of the head-mounted display;
updating the visual-field image based on the direction of the virtual camera.

2. The method according to claim 1, further comprising restricting a movable range of the character object along the peripheral direction in response to a predetermined condition being satisfied.

3. The method according to claim 2, wherein the predetermined condition comprises a type of a competitive game or an elapsed time in at least one round of the competitive game.

4. The method according to claim 2, wherein the restricting of the moveable range comprises changing the movable range of the character object depending on a level of a round in a game or an elapsed time in the round.

5. The method according to claim 2, wherein the restricting of the moveable range comprises placing a wall object in the field, the wall object restricting the movable range.

6. The method according to claim 2, wherein the restricting of the moveable range comprises changing a shape of the field, the shape being determined for restricting the movable range.

7. The method according to claim 1, wherein the updating of the visual-field image comprises changing the direction of the virtual camera in synchronization with the movement of the head-mounted display without changing a position of the virtual camera.

8. The method according to claim 1, further comprising prohibiting the character object from moving in a depth direction of the visual field in the field in response to the movement input.

9. A method comprising:
defining a virtual space including a virtual camera, a character object, and a field in which the character object is movable, the field defining a peripheral direction and surrounding the virtual camera along the peripheral direction;
defining a visual field of the virtual camera;
displaying a visual-field image on a head-mounted display based on the visual field and the virtual space;
detecting a movement input;
moving the character object in the field along the peripheral direction in response to the movement input;
detecting movement of the head-mounted display;
changing a direction of the virtual camera based on a detected movement of the head-mounted display, wherein the changing the direction of the virtual camera comprises changing the direction of the virtual camera in synchronization with the movement of the head-mounted display without changing a position of the virtual camera in the virtual space
updating the visual-field image based on the direction of the virtual camera.

10. The method according to claim 9, wherein
the movement input including a lateral-direction component, the lateral-direction being different from the peripheral direction;
the moving of the character object comprises moving the character object in the peripheral direction in response to the lateral-direction component.

11. A system comprising:
a head-mounted display; and
a processor, wherein the processor is configured to execute instructions stored on a non-transitory computer readable medium for:
providing instructions for defining a virtual space including a virtual camera, a character object, and a field in which the character object is movable, the field defining a peripheral direction and surrounding the virtual camera along the peripheral direction;
providing instructions for defining a visual field of the virtual camera;
providing instructions for displaying a visual-field image on the head-mounted display based on the visual field of the virtual camera and the virtual space;
detecting a movement input including a lateral-direction component, the lateral-direction being different from the peripheral direction;
providing instructions for moving the character object in the field along the peripheral direction in response to the lateral-direction component of the movement input;
detecting movement of the head-mounted display; providing instructions for changing a direction of the virtual camera based on detected movement of the head-mounted display;
updating the visual-field image based on the direction of the virtual camera.

* * * * *